April 7, 1959    B. WELTE    2,880,652
RING GEAR BROACHING MACHINE
Filed Nov. 28, 1952    9 Sheets-Sheet 2

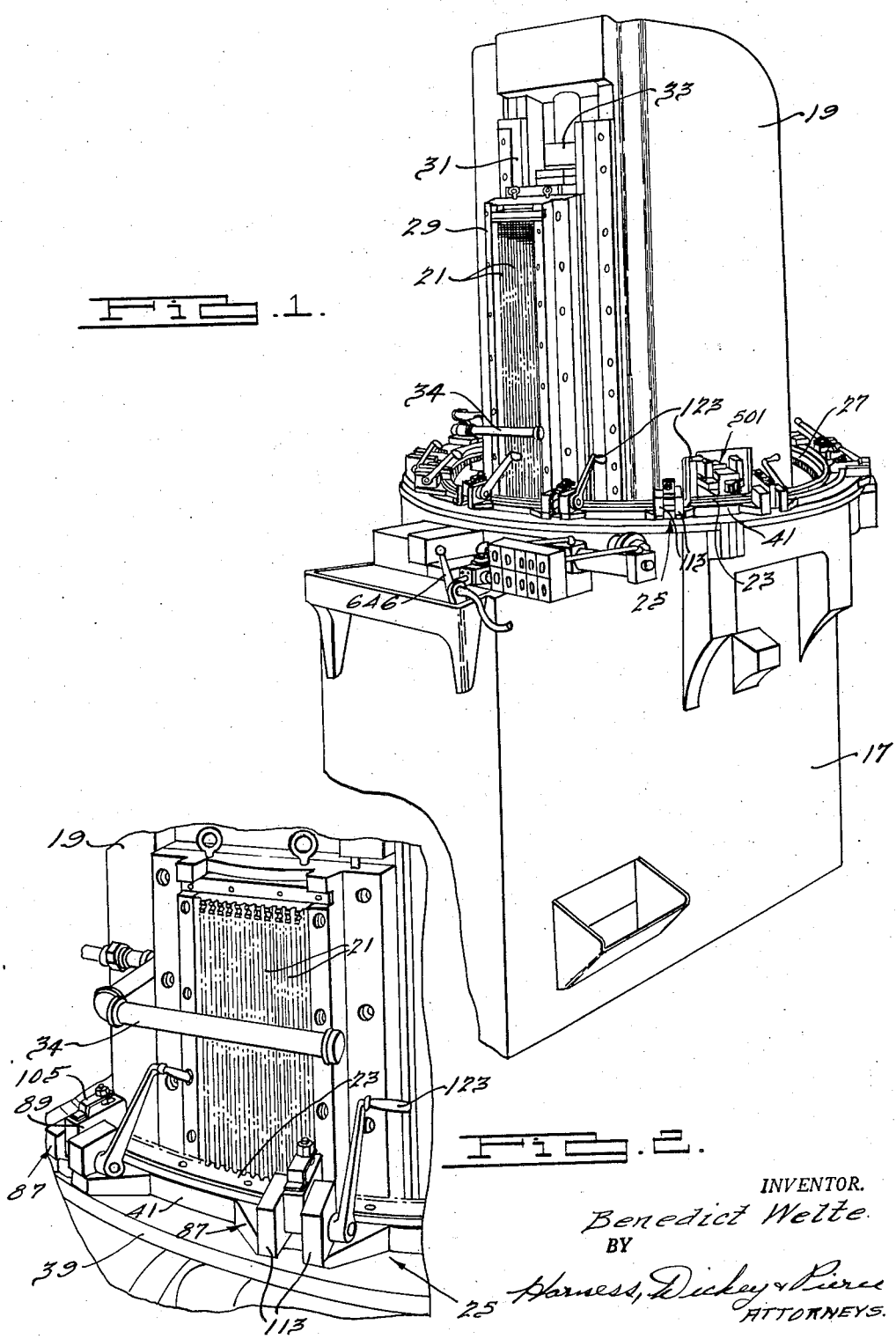

INVENTOR.
Benedict Welte.
BY
Harness, Dickey & Pierce.
ATTORNEYS

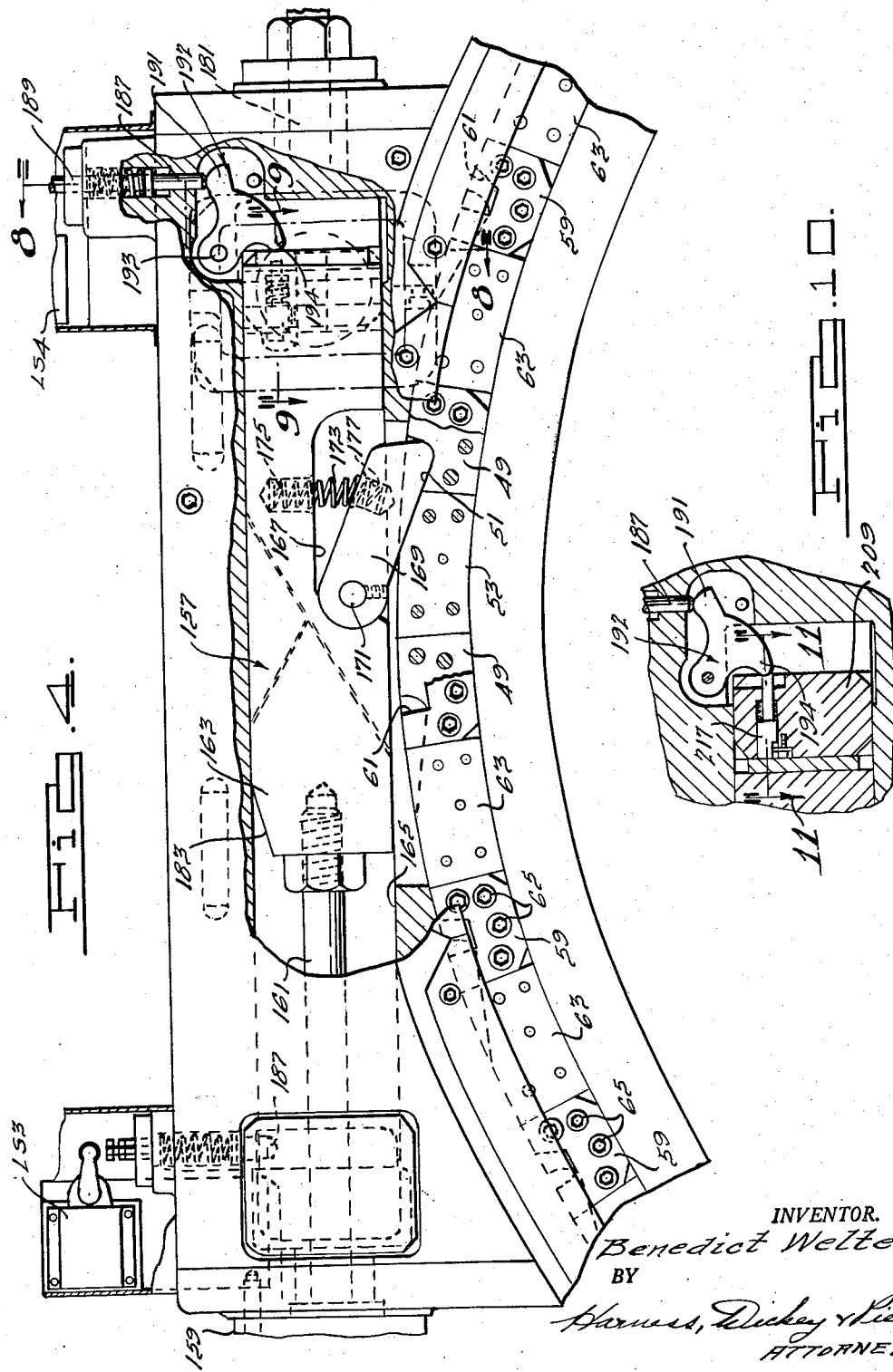

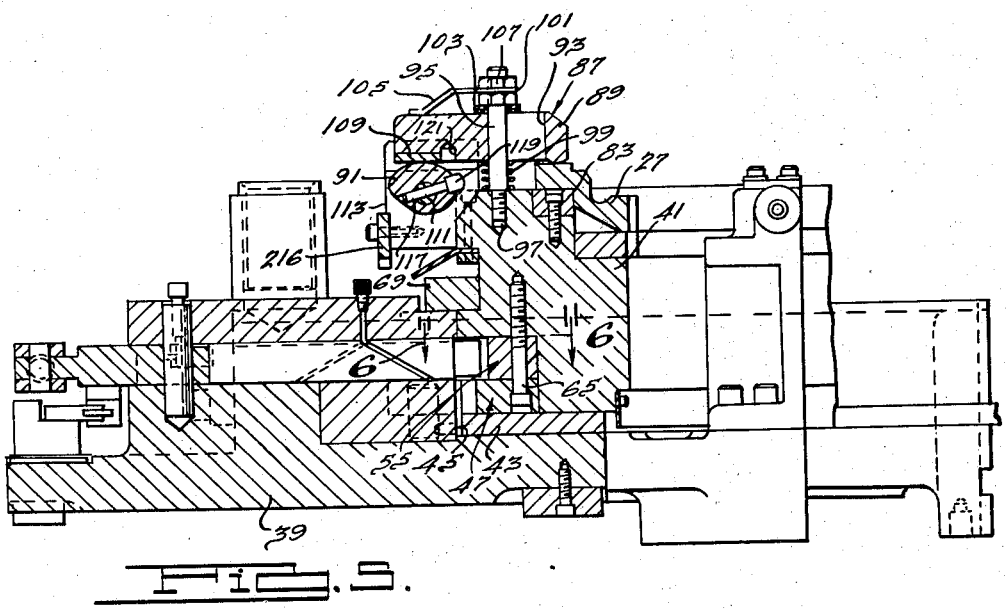
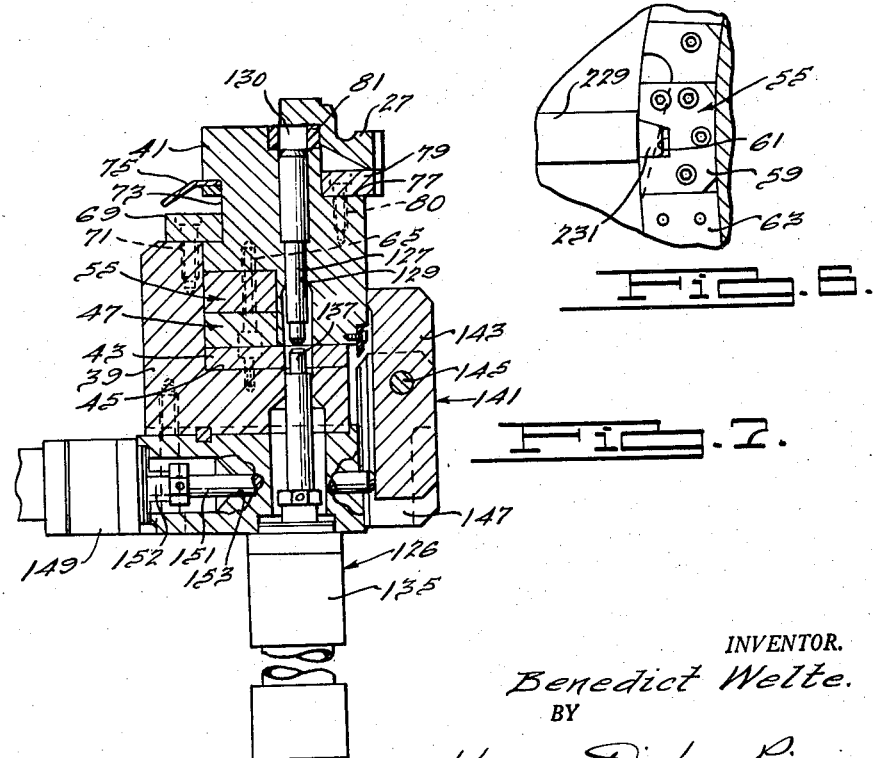

April 7, 1959 B. WELTE 2,880,652
RING GEAR BROACHING MACHINE
Filed Nov. 28, 1952 9 Sheets-Sheet 5
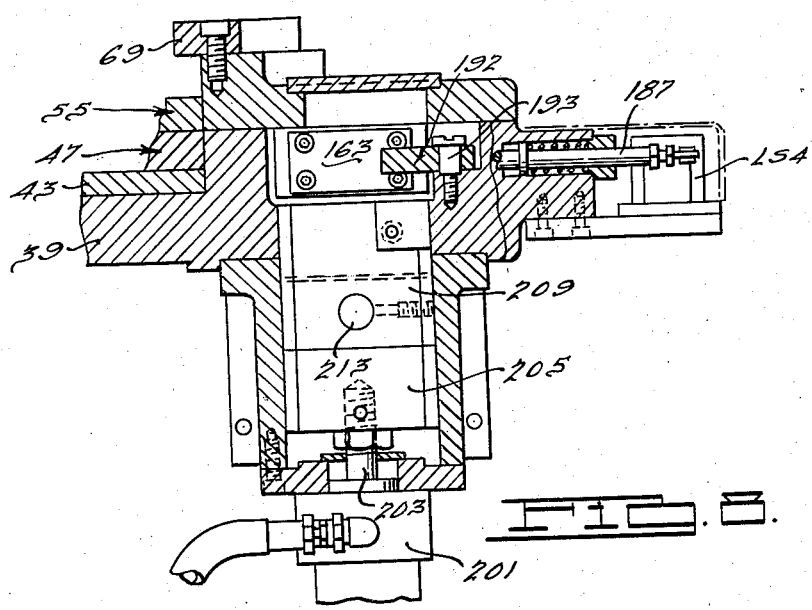
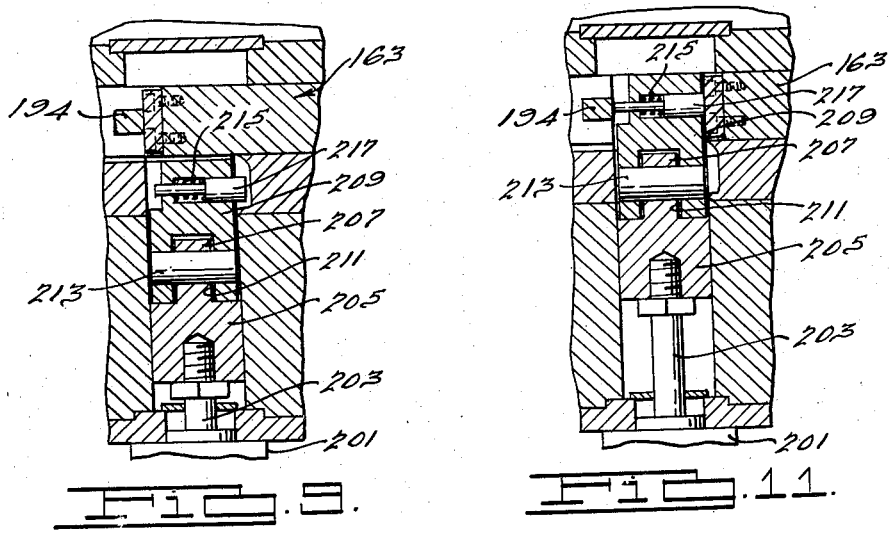
INVENTOR.
Benedict Welte.
BY
Harness, Dickey & Pierce
ATTORNEYS.

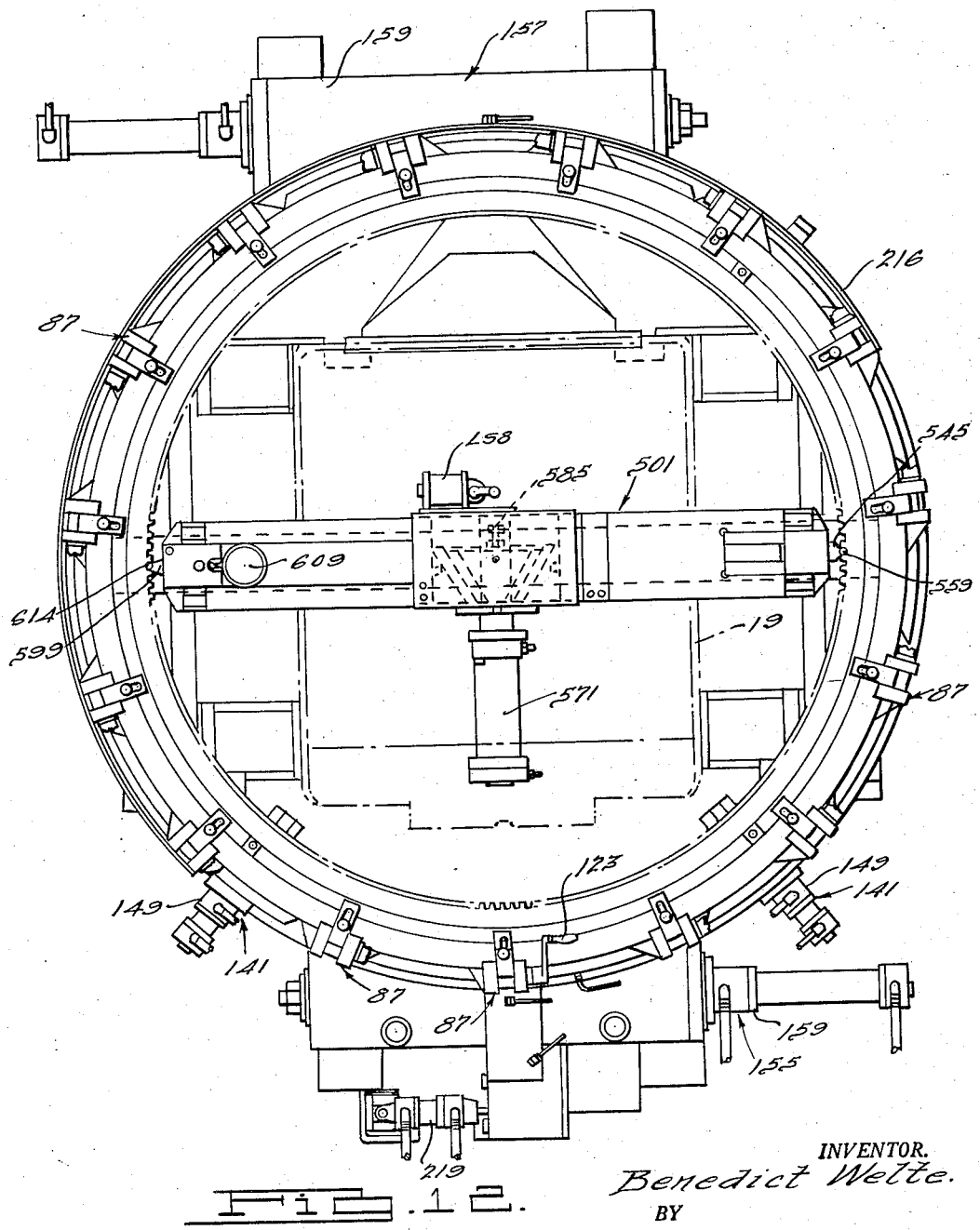

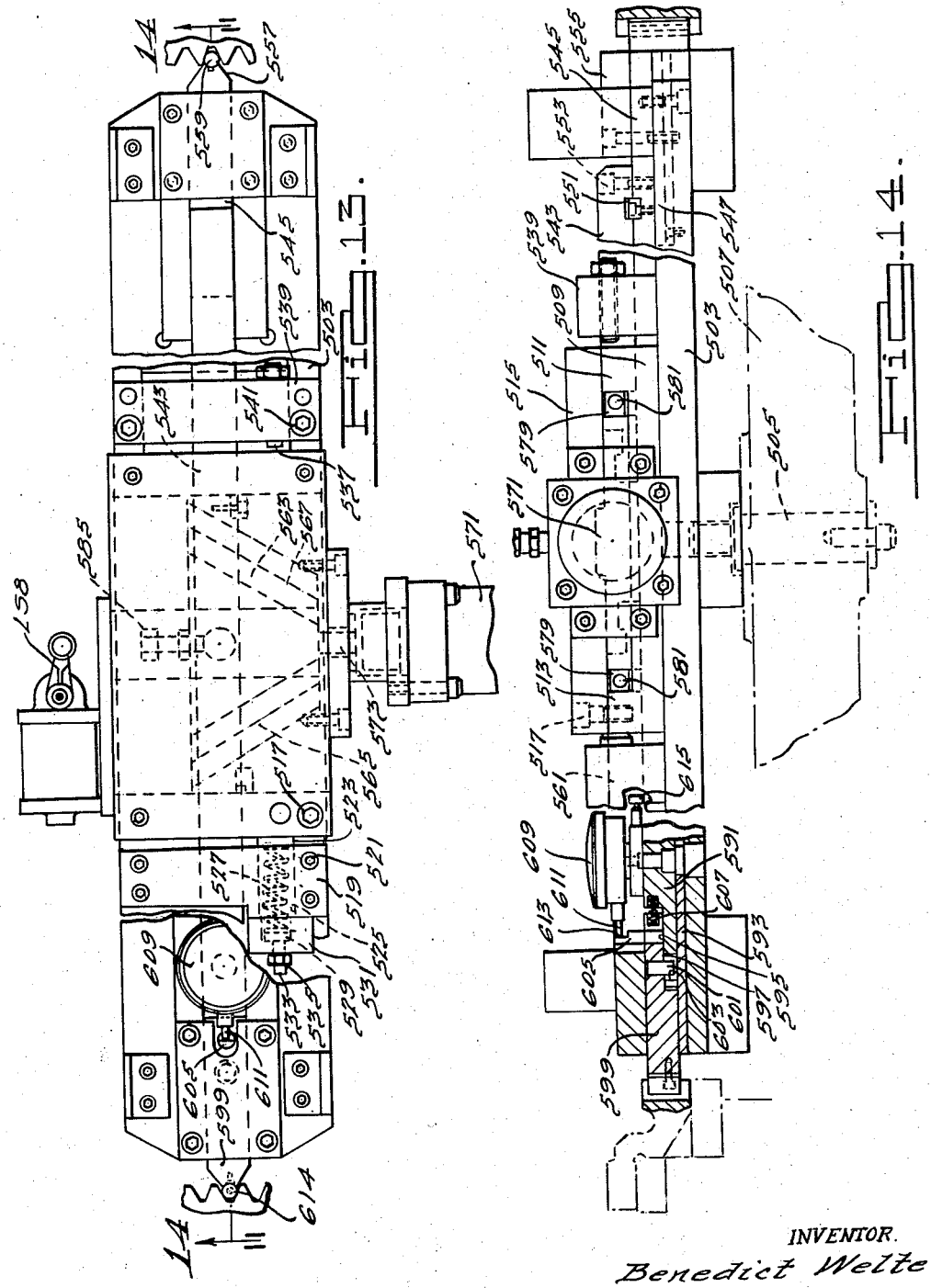

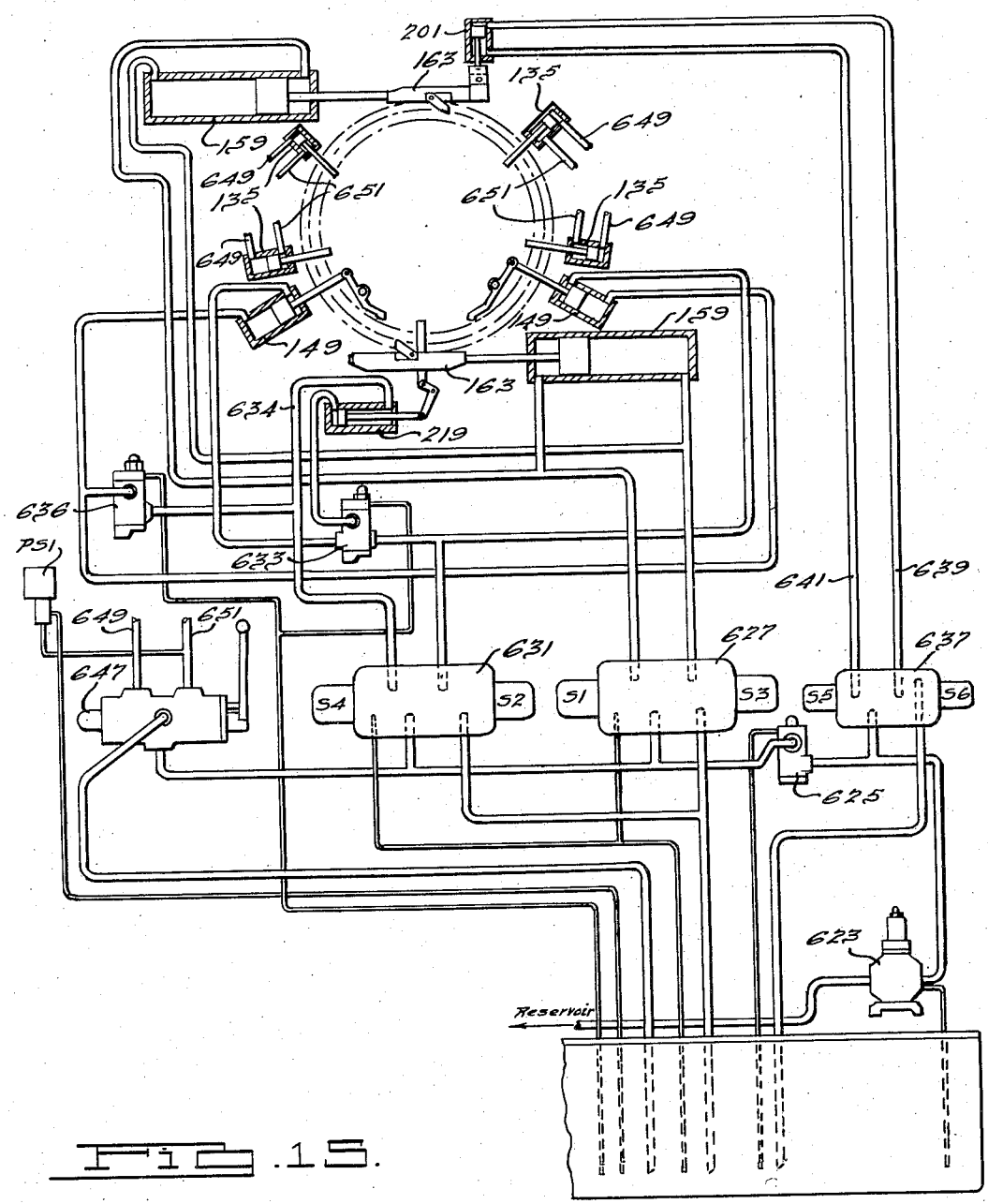

United States Patent Office 2,880,652
Patented Apr. 7, 1959

2,880,652

RING GEAR BROACHING MACHINE

Benedict Welte, Lake Orion, Mich., assignor to Colonial Broach Company, Warren Township, Macomb County, Mich., a corporation of Delaware Application November 28, 1952, Serial No. 322,867

4 Claims. (Cl. 90—10)

This invention relates generally to broaching machines and more particularly to a machine for broaching teeth of extremely large ring gears or the like.

In recent years extremely large gears have been used in ever increasing quantities. Such gears are used on various types of vehicles and equipment and as an example, are used for military tank turrets. Certain military tank turret gears have a pitch diameter of approximately six feet and 294 four-pitch teeth. Using conventional broaching or cutting methods, it has in the past required approximately four and one-half hours of cutting time to produce a gear of this type. If such gears are used in large numbers, it is of course imperative, both from a cost and production standpoint, that such gears have their teeth cut in a considerably shorter period of time, while at the same time maintaining high precision standards and extremely close tolerances.

It is therefore an object of this invention to provide a broaching machine for cutting gear teeth in a much more rapid, inexpensive manner than has been heretofore possible, while maintaining high precision standards and close tolerances.

It is a further object of this invention to provide a device of the aforementioned type, which can be operated with a minimum of manual labor and which is relatively easy to maintain and extremely durable.

It is a still further object of this invention to provide a machine which broaches a plurality of gear teeth simultaneously, and in which relative indexing movement between the broaches and the work gear is accomplished in a manner that insures proper and rapid broaching and forming of all of the gear teeth irrespective of the total number of teeth to be broached and irrespective of whether or not the total number of teeth is evenly divisible by the number of teeth broached during each broaching stroke.

It is a still further object of this invention to provide an improved indexing mechanism for obtaining the aforementioned relative movement between the work gear and the broaches, so that the relative movement will be accurately controlled and automatic in operation.

It is a still further object of this invention to provide a machine of the aforementioned type, in which the broaches and operating mechanism therefor are disposed within the confines of the work gear when the latter is mounted on the machine, thereby providing a more efficient method of broaching the gear teeth.

It is a still further object of this invention to provide a machine of the aforementioned type, in which a checking fixture or gauge is supported on the machine so that the pitch diameter of the gear may be checked while the gear is supported on the machine and immediately after the broaching operation.

These and other objects of this invention will become apparent from the following detailed description, taken in conjunction with the accompanying drawings, in which:

Figure 1 is a perspective view of the machine of this invention with a ring gear supported thereon;

Fig. 2 is an enlarged fragmentary, perspective view showing the broaches in engagement with the ring gear;

Fig. 3 is a fragmentary plan view of the front portion of the fixture with the broaches and their supporting structure removed, for purposes of clarity;

Fig. 4 is a fragmentary plan view, partially in section and partially in elevation, of a rear portion of the gear supporting fixture;

Fig. 5 is an enlarged sectional view of the structure illustrated in Fig. 3, taken along the line 5—5 thereof;

Fig. 6 is an enlarged sectional view of the structure illustrated in Fig. 5, taken along the line 6—6 thereof;

Fig. 7 is an enlarged sectional view of the structure illustrated in Fig. 3, taken along the line 7—7 thereof;

Fig. 8 is an enlarged sectional view of the structure illustrated in Fig. 4, taken along the line 8—8 thereof;

Fig. 9 is an enlarged sectional view of the structure illustrated in Fig. 4, taken along the line 9—9 thereof and illustrating an indexing stop mechanism in its retracted position;

Fig. 10 is a fragmentary sectional view of the indexing control mechanism illustrated in Fig. 4, and showing the stop mechanism in its extended position;

Fig. 11 is an enlarged sectional view of the structure illustrated in Fig. 10, taken along the line 11—11 thereof;

Fig. 12 is a top plan view of the fixture of this invention, with the central vertical column and broaches supported therein, shown only in outline form, for purposes of clarity, and illustrating the checking gauge supported on the fixture and engaging the work gear for checking the pitch diameter thereof;

Fig. 13 is a top plan view of the checking device;

Fig. 14 is a sectional view of the structure illustrated in Fig. 13, taken along the line 14—14 thereof;

Fig. 15 is a diagrammatic view of the hydraulic operating circuit of the fixture; and Fig. 16 is a diagrammatic view of the electrical circuit of the machine and fixture.

Figure 18:
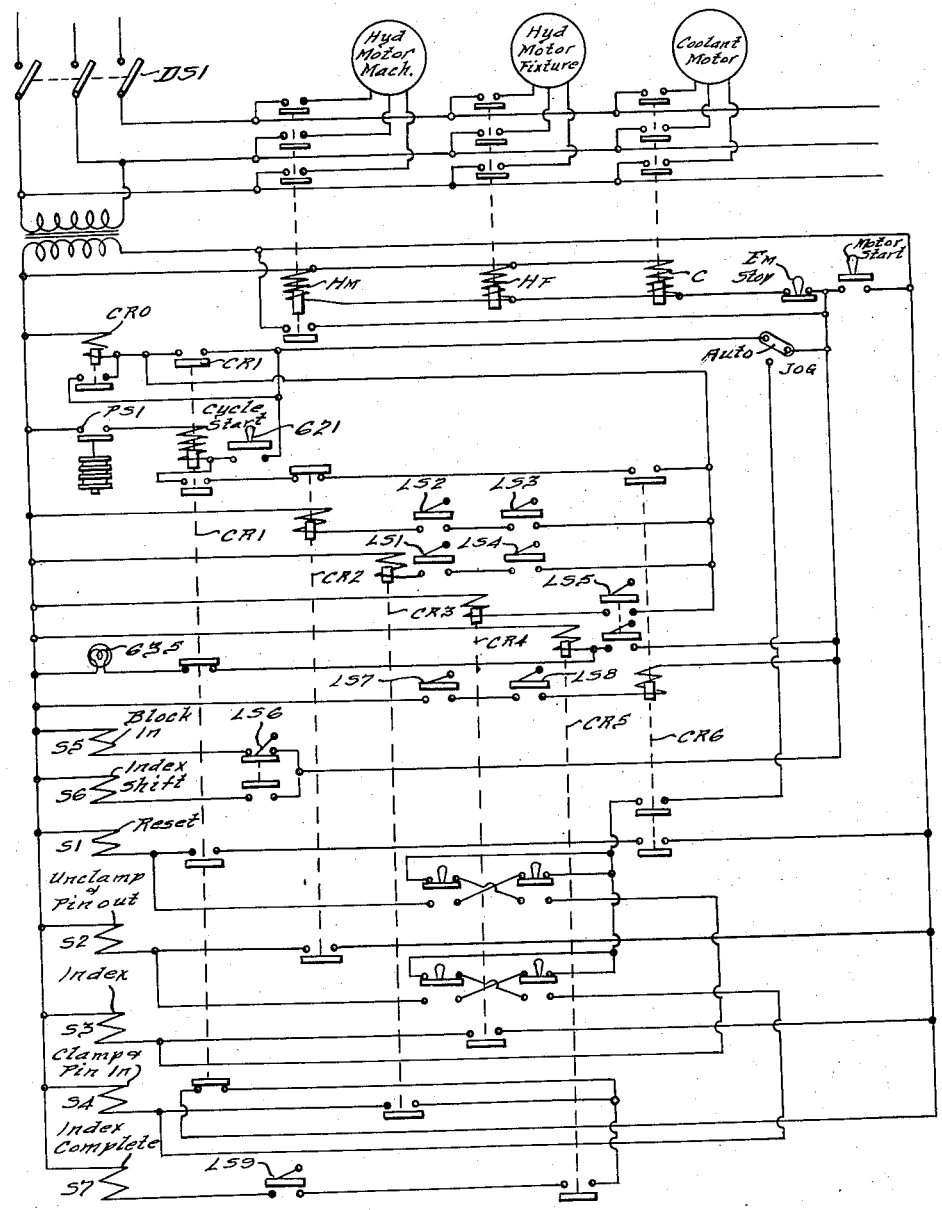

Referring now to the drawings, and more particularly to Figures 1 through 4, it will be seen that the machine includes a suitable and stationary housinglike base or supporting structure 17, having an upwardly extending, vertical column 19, on which vertically movable broaches 21 are supported for broaching gear teeth in a large ring gear 23, supported on a fixture 25, which encompasses the vertical column 19 and is supported on the base structure 17. The ring gear 23 illustrated in the drawings has a pitch diameter of approximately six feet, and after being broached, has 294 four-pitch teeth 27 formed on the inner periphery thereof. For purposes of illustration, eleven vertically extending broaches 21 are disposed in a side-by-side relationship in a suitable supporting slide structure 29, which in turn is supported for vertical sliding movement in suitable ways 31, on the vertical column 19. A hydraulically operated ram 33 is carried by the vertical column 19 for moving the broaches upwardly and downwardly in a suitable or conventional manner. A suitable perforated conduit 34 is supported adjacent the broaches for lubricating or cooling the same with a suitable liquid.

The fixture 25 is supported on a movable platen 35 on the base structure 17 and is adjustably connected with the platen at 37, as well as by hold down bolts or screws 38. This arrangement permits fore and aft adjustment of the fixture on the platen. The platen 35 in turn is supported on the machine base for shuttling movement toward and away from the broaches so that the broaches will, in the usual manner, only cut the work gear teeth during their reciprocation in one direction.

As can be seen in Fig. 5, the fixture 25 includes a base 39, which is supported on the platen, and a rotor 41 which is supported on the base 39 for rotation relative thereto, through a suitable wear plate 43. The base 39 is suitably notched out or recessed at 45, adjacent its inner edge, to receive the wear plate 43. Supported on the wear plate 43 is an annular indexing member 47, which is formed, as can be best seen in Fig. 4, from a plurality of blocks or segments 49, each having a notch or recess 51 in the outer periphery thereof. The index blocks or segments 49 are spaced apart by means of spacer blocks 53. Supported on the index member 47 is an annular locking or positioning member 55 which likewise is comprised of a plurality of blocks 59, each having an inwardly extending tapered notch or opening 61 therein for the reception of a locking plunger, as will hereinafter appear. The blocks 59 are spaced by suitable spacer blocks 63, so as to extend circularly around the fixture and on top of the indexing member 47. The various segments and spacer members of the index member 47 and locking member 55 are secured to the fixture rotor 41 by suitable means such as cap screws 65. An annular gib 69 (Fig. 7) is connected with the fixture base 39 by suitable means such as cap screws 71 and engages a vertical surface 73 of the rotor 41 to guide the same during its rotation relative to the base member. A shieldlike plate 75 is connected with the rotor and overhangs the gib 69 to prevent chips or other foreign material from dropping down between the gib 69 and the rotor 41. The inner face of the rotor 41, adjacent the top thereof, is recessed or cut back to provide an annular notch 77 on which is supported an annular ring or gib 79. The ring 79 is connected to the rotor by suitable means such as cap screws 80. The ring gear is mounted on the fixture by being sleeved over the machine vertical column 19, and has the under side of its inner periphery resting upon the ring 79, while adjacent its outer periphery it rests upon and is held centrally by an annular plate or gib member 81 connected with the fixture rotor by means of suitable cap screws or the like 83. The fixture base 39, because of its large annular extent, is made in sections and the sections are secured together by suitable connecting members 85, as can be best seen in Fig. 3.

The ring gear 27 is clamped on the fixture rotor by means of a plurality of circumferentially spaced clamping devices indicated generally at 87. Each of the clamping devices 87 includes a clamping member 89, the under side of which, adjacent the inner end thereof, rests upon the top of the ring gear 27, while the under side of the outer end thereof rests upon a cam member 91. The clamping member 89 has an elongated slot 93 therein, through which a stud 95 extends. The lower end of the stud is threaded into the fixture rotor at 97 and a coil spring 99 is disposed between the upper surface of the fixture rotor and the under side of the clamping member 89. A nut 101 is threaded on the upper end of the stud 95 and engages washers 103 resting on the upper surface of the clamping member 89. One end of a leaf spring 105 is sleeved over the upper end of the stud 95 and secured thereto by means of a second nut 107 threaded on the upper end of stud 95, which acts to clamp the leaf spring 105 against the nut 101. The outer end of the leaf spring 105 engages the top surface of the clamping member 89, adjacent the outer end thereof. The clamping member 89 has a wear plate 109 connected with the under side thereof adjacent its outer end, which abuts the cam 91. The cam 91 is carried by a shaft 111 which in turn is rotatably supported in stationary brackets 113 which are secured to the fixture rotor by any suitable means. Connected with the cam 91 and its shaft 111 is a pin 117, having an enlarged head 119 which projects beyond the periphery of the cam and is adapted to be received in a recess 121 in the under side of the clamping member 89.

A handle 123 is connected with the cam shaft 111 so that the clamping cam can be actuated by the machine operator, to clamp the ring gear to the fixture or release it therefrom. When the ring gear is loaded into the fixture the handle 123 of each clamping device is actuated so as to turn the cam in a counterclockwise direction, as seen in Fig. 5, so that the enlarged head 119 on the cam pin 117 will engage in the clamping member recess 121 and slide the clamping member outwardly relative to the fixture rotor to permit the ring gear to be lowered onto the rotor. The ring gear is then clamped in place by rotating each handle 123 in a clockwise direction, which movement will cause the head on its cam pin to move its clamping member inwardly so that the under side of the clamping member will slide over the top of the ring gear. Further rotation of the cam shaft will cause the cam to engage the under side of the clamping member adjacent the outer end thereof and clamp the ring gear in place.

After the ring gear has been broached and it is desired to remove the same from the fixture, the handles 123 are turned in a counterclockwise direction to move the clamping members 89 out of engagement with the ring gear, and to aid in releasing or moving the ring gear away from the fixture rotor, spaced stripper or ejector devices 126 are provided. Each of these devices includes an ejector pin 127 which is slidably mounted in an aperture 129 in the fixture rotor and which is adapted to extend upwardly through an aperture 130 in the gib or plate member 81. A hydraulic piston and cylinder unit 135 is supported on the fixture base and has a pinlike portion 137 on the upper end of its piston rod so that when the unit 135 is actuated the pin portion 137 will engage the ejector pin 127 and the same will move upwardly to engage the under side of the ring gear to move the same away from the fixture rotor to permit easy removal from the machine.

In order to insure the proper alignment and positioning of the fixture rotor 41 and also in order to eliminate running clearance between the rotor and the rotor supporting structure including gib 69, a pair of hydraulically actuated, rotor clamping devices 141 are supported on the rotor base on opposite sides of the broach. These clamping devices insure a metal-to-metal contact between the rotor and gib, adjacent the broaches, so that there is no running clearance, such as caused by an oil film, which would affect the broaching operation precision. As these devices are both similar, only one will be described in detail. Each device 141 includes a clamping member 143, which is rotatably supported on a shaft 145, which in turn is journaled on bracket members 147 which are rigidly connected with the fixture base. A hydraulic piston and cylinder unit 149 is supported on the base adjacent the outer periphery thereof, and has a plunger 151 connected to its piston rod 152, which extends through a suitable aperture 153 in the base for engagement with the lower end of the clamping member 143. Therefore, when the hydraulic piston and cylinder unit is actuated to move the plunger radially inwardly, the plunger will engage the lower end of the clamping member 143 and cause the upper end to swing into engagement with the inner face of the fixture rotor 41 to clamp the same tightly against the base and the gib 69.

After the broaches 21 have broached the teeth in one section of the ring gear and have returned to their normal position, the ring gear must be indexed to present the next portion of the ring gear in position to have gear teeth broached thereon. For this purpose, and because of the size of the ring gear fixture, etc., and in order to avoid twisting, bending or other undesirable conditions, two opposed indexing mechanisms are provided for indexing the work gear and fixtures. One indexing mechanism is indicated generally at 155 and is supported on the machine adjacent the front thereof, as can be seen in Fig. 3. The other indexing mechanism is indicated generally at 157 and is supported on the machine adjacent the back thereof, as can be seen in Figs. 4 and 12.

As these indexing mechanisms are substantially identical in most respects, only the back or rear indexing mechanism will be described in detail. As can be best seen in Fig. 4, the indexing mechanism 157 includes a hydraulic piston and cylinder unit 159, which is supported on the stationary base and has a piston rod 161 projecting inwardly therefrom. The inner end of the piston rod 161 is threadably connected with a slide 163, which is guided in suitable ways 165 in the stationary machine portion. The slide 163 is provided with a notch or recess 167 in which an indexing plunger or finger 169 is rotatably supported on a stud 171, which in turn is connected to the slide. A coil spring 173 has one end disposed in a recess 175 in the slide and the opposite end disposed in a recess 177 adjacent the free end of the indexing finger 169, so as to resiliently urge the finger into engagement with the indexing member 47. The indexing finger 169 is adapted to be received in the indexing notches 51 so that when the slide 163 of each of the indexing mechanisms 157 and 155 is actuated, the finger 169 will act against the end of the index notch 51 to rotate the ring gear and fixture rotor. When the slide is returned to its original position or moved to the left, as viewed in Fig. 4, the indexing finger can, because of the resiliency of spring 173, retract into the pocket 167 until it engages the next notch 51 in the indexing member.

An adjustable stop member 181 is supported in the stationary portion of the fixture against which the slide 163 is adapted to abut when it reaches the end of its indexing stroke during a portion of the indexing operation, as will be hereinafter described. The opposite ends of slide 163 of the front indexing mechanism 155 and the left hand end of slide 163 of the indexing mechanism 157 are chamfered at 183 so that when the front indexing slide reaches the left hand end of its stroke it will engage and actuate a plunger 187 of a plunger assembly 189 which is adapted to actuate a limit switch LS1, for a purpose which will be hereinafter described. Similarly, when the slide reaches the opposite end of its stroke it contacts through a similar plunger and assembly 187 and 189, a limit switch LS2. When the slide 163, of the back indexing mechanism 157, reaches the left hand end of its stroke, it contacts a limit switch LS3 through a similar plunger 187 and assembly 189. A similar switch LS4 is provided adjacent the opposite end of the slide 163 of the back mechanism 157 and is actuated by movement of a plunger 187 of a plunger assembly 189. The plunger 187, however, is actuated by one arm 191 of a bell crank 192, which is rotatably supported on a cap screw 193. The opposite arm 194 of bell crank 192 is adapted to be actuated by one end of the slide 163 during one phase of the indexing operation of the machine and by other mechanisms to be described, during another phase of the indexing operation. For reasons which will hereinafter appear, it is necessary that the stroke of the slide 163 of the back indexing mechanism 157 be shortened during a portion of the indexing operation of the machine.

A piston and cylinder unit 201 is carried by the machine and upon actuation will cause movement of the piston rod 203 which is threaded into a sliding block member 205, which has a reduced projection 207 on the inner end thereof. A stop 209 is slidingly supported in the base and has a recess 211 in the lower end thereof, in which the projection 207 nests. A pin 213 interconnects the sliding block 205 and stop 209. The stop 209 has a recess 215 in the inner end thereof, in which a spring loaded plunger 217 is slidably supported. When the piston and cylinder is actuated, the stop is moved upwardly to the position illustrated in Fig. 11, wherein it will be seen that the slide 163 will abut the stop and will move the plunger 215 into engagement with the arm 194 of bell crank 192 to actuate the switch LS4, even though the slide moves a lesser distance than when the stop was removed.

As previously pointed out, the ring gear illustrated has 294 teeth broached on the inner periphery thereof. As eleven teeth are broached during each stroke of the broaches, it can be appreciated that 294 is not evenly divisible by eleven. Therefore eleven teeth will be broached during twenty-six of the broaching strokes and only eight teeth will be broached during one of the broaching strokes. It is thus necessary to construct the indexing mechanism so that one short indexing stroke will occur during which only eight teeth will be broached, in order that the fixture and ring gear will return to its original starting position after the broaching cycle is completed. In view of the fact that two indexing mechanisms or devices, that is one adjacent the front and one adjacent the back, are provided, a special mechanism is necessary to effect this short indexing stroke. The spacing between the indexing notches 51 in the index blocks 49 is equal to the spacing desired for the broaching of eleven teeth, except that one notch 51 is spaced from its adjacent notch only a distance corresponding to the spacing of eight teeth on the ring gear. Also, the rotor 41 carries around the outer periphery thereof a cam 216 which is adapted to contact and actuate a limit switch LS6 carried by the base 39 and illustrated only in Fig. 16. When the short notch 51 reaches a point to be engaged by the front indexing mechanism, the cam 216 engages the limit switch LS6 and causes actuation of the piston and cylinder unit 201, which moves the stop 209 upwardly to the position illustrated in Fig. 11, wherein the slide 163 will abut the same rather than move its full distance into engagement with the adjustable stop 181. The slides 163 of both indexing mechanisms are capable of moving from their retracted position to their extended position, a distance greater than the necessary indexing movement, so that when the short notch is in a position for engagement by the front indexing mechanism, this mechanism will move a greater distance before engaging the notch than with the normally spaced notches, and due to the positioning of the stop in the rear indexing mechanism, the ring gear will only be indexed an amount equal to eight teeth. Thereafter, the stop will stay in position to engage the slide of the back indexing mechanism, while the front indexing mechanism will engage the notches spaced apart in an amount corresponding to eleven teeth until the short notch comes into engagement with the back indexing mechanism, at which time the cam 216 will move out of engagement with limit switch LS6, which will cause actuation of the piston and cylinder 201 and will cause the stop to move downwardly so that the back indexing mechanism can move its full distance into engagement with the adjustable stop 181. The stop will then stay in its outward, inactive position, until the short notch again reaches position for engagement by the front indexing mechanism, whereupon its repositioning, as previously described, will occur. It will thus be seen that in this manner the ring gear and fixture will always return to their original starting position, even though a short indexing movement is necessary because the total number of teeth to be broached is not evenly divisible by the number of teeth broached during each broaching stroke.

When the slide has moved to index the ring gear, this movement is a few thousandths less than the desired movement of the gear to properly position it for the subsequent broaching operation, for a reason which will hereinafter appear. Immediately upon the completion of the indexing operation, switches LS1 and LS4 are actuated, which in turn cause the actuation of a piston and cylinder unit 219, which is supported on the machine adjacent the front thereof. The piston rod 221 of this unit is connected with a bell crank 223, which in turn has a studlike end 225 thereon, engaged in a recess 227 of a slide plunger 229. The inner end of the slide plunger 229 is provided with a tapered portion 231, which is adapted to engage the tapered notch 61 in the locking member 55. Upon engagement of the tapered portion 231 with the notch, when the plunger 229 is forced inwardly, it will move the ring gear a few thousandths further to lock the same in a predetermined, exact position. Upon the locking of the ring gear and fixture in position, the broaching cycle can begin.

After the ring gear has been broached and before it is removed from the machine, it should be checked to determine whether or not the pitch diameter of the gear is within the desired limits. In order to perform this checking operation easily and efficiently, a checking fixture generally indicated at 501, is supported in and is adapted to extend through the side walls of the machine vertical column for engagement with the gear teeth on opposite sides of the gear. The checking fixture 501 includes a laterally and horizontally extending base member 503, which is supported in substantially the center of the ring gear on a post 505, which in turn is supported on a fixed fixture cross member 507 in the machine vertical column. The base 503 is free to rotate on the post 505 and has a carriage base member 509 slidably supported thereon intermediate the opposite ends thereof. The carriage base member 509 is provided with a pair of upstanding projections or postlike portions 511 and 513 adjacent opposite ends thereof. A cover plate 515 rests on the top of the projections or posts 511 and 513, and is rigidly connected with the carriage base 509 by suitable cap screws or the like 517.

A retainer block 519 is rigidly connected with the base 503 to the left of the carriage base 509, as viewed in Fig. 13, by means of suitable cap screws 521. A plunger 523 is slidably supported in an aperture 525 in the retainer 519. A coil spring 527 is disposed in the aperture 525 and engages the plunger 523 to urge the same toward the carriage base 509. The opposite end of the spring 527 engages a plunger 529 supported in a cap 531 connected by suitable bolts or the like with the retainer 519. The plunger 529 is provided with a threaded stem 533, which projects through the cover 531 and has a nut 535 thereon so that the position of the plunger 529 can be varied to vary the compressed length of the spring 527. The spring 527 urges the carriage base and all parts carried thereby to the right as viewed in Fig. 13 until the base abuts a stud 537 supported in a retainer 539, which is rigidly connected with the base 503 by suitable means such as cap screws 541. Thus the spring 527 acts to move the carriage base 509 off center relative to the center of the ring gear, for a reason which will hereinafter appear.

A slide bar 543 is slidably supported on the carriage base between the spaced projections or posts 511 and projects laterally therefrom through a suitable opening in the retainer 539. The outer end of the slide bar 543 rests upon the inner end of a slide bar extension 545 which is disposed therebelow and is slidably supported on a wear plate 547, which in turn is connected with the base 503. The bar 543 is connected with the extension 545 through a suitable key 551 and cap screws 553. The extension 545 extends through a suitable guide block 555, which in turn is supported on the base 503 so that the extension 545 has its movement confined to lateral movement inwardly and outwardly. The outer end of the extension 545 is tapered at 557 and carries a roll 559 which is adapted to engage opposite faces of the ring gear teeth on the pitch line thereof.

A second slide bar 561 is slidably supported in the carriage base 509 in the same manner as the slide bar 543, but extends in the opposite lateral direction from the slide bar 543. A slide bar actuator member 563 is supported on the carriage base 509 between the posts or projections 511 and 513 and is formed with tapered or angled side faces 565 and 567, which engage the adjacent inner ends of the slide bars 543 and 561 so that when the actuator member 563 is moved inwardly or outwardly relative to the carriage base 509, the slide bars will be moved laterally inwardly or outwardly. The actuator member 563 is moved by means of a hydraulic piston and cylinder unit 571, which is supported on the checking device and the piston rod 573 of which is threadably connected with the actuator member 563. Each of the slide bars 543 and 561 has key or stop members 579 connected therewith by any suitable means such as cap screws 581 so that when the slide members are actuated and moved laterally outwardly by the actuator member 563, the stop members 579 will abut the posts 511 or 513 to limit the outward movement thereof. A cap screw 585 is connected with the actuator member 563 at the back end thereof and is adapted, when the actuator member moves rearwardly, to engage a switch LS8 which is interlocked with the machine operating mechanisms in a manner which will be described.

The slide bar 561 is connected with a slide bar extension 591, which is disposed therebelow, in substantially the same manner as the slide bar 543 is connected with the extension 545. The extension 591 is slidably supported on a wear plate 593, which in turn is supported on the base 503 by any suitable means. The extension 591 is stepped down adjacent its outer end to provide a flat surface 595 which slidably engages a cut back flat surface 597 on the underside of an arm 599, which likewise is slidably supported on the wear plate 593. The arm 599 carries a downwardly projecting pin 601 adjacent its inner end and the lower end of the pin is disposed in an elongated slot 603 in the extension 591 adjacent the outer end thereof. The arm 599 carries an upwardly projecting pin 605 adjacent the inner end thereof and above the outer end of the extension 591. A coil spring 607 is disposed between the extension 591 and the arm 599 to yieldably urge the arm 599 outwardly. A dial indicator 609 is supported on the extension 591 and has an actuating plunger or pin 611 projecting horizontally outwardly therefrom and adapted to be engaged by a flat surface 613 on the upper end of the pin 605. An adjusting screw 615 is provided for adjusting the position of the dial indicator 609 relative to the extension 591 and/or the pin 605. The arm 599 is tapered at its outer end and carries a roll 614 for engaging the ring gear teeth in the same manner as roll 559.

The coil spring 527 normally shifts the base carriage 509 to the right as viewed in Figs. 13 and 14, so that the actuator 563 is disposed to the right of the center of the ring gear. When it is desired to check the pitch diameter of the ring gear, a valve is operated which actuates the piston and cylinder unit 571 and causes the actuator 563 to move inwardly, which movement causes the slide bars 511 and 561 to move laterally outwardly. This movement will continue until the keys or stops 579 on the slide bars engage the carriage base posts or projections 511 and 513. However, prior to the engagement of the posts 511 and 513 the roll 559 on the outer end of the slide bar extension 545 will engage the teeth on the ring gear. Further actuation will cause the entire unit to move to the left against the action of the spring 527, and the roll 614 in the outer end of the arm 599 will engage the teeth of the ring gear on the opposite side thereof, which engagement will cause the arm 599 to move inwardly against the action of the spring 607. Movement of the arm 599 inwardly will cause the post or pin 605 to engage the dial indicator arm 611 and provide an indicator reading. It will be appreciated that the slide bar 561 cannot move outwardly far enough, due to the engagement of the key or stop 579 with the carriage base post 513, to cause the pin 601 to engage the inner end of the extension slot 603. If the pin does engage the inner end of the slot 603, then of course, the gear would not be within the required indicator limits.

Referring now to Figs. 15 and 16 and the operation of the machine when it is desired to broach a ring gear, the ring gear is sleeved over the vertical column and clamped into position on the fixture, as previously described. The loading is done when the fixture is in its shuttled out or extended position so that the ring gear will be disposed away from the broach. When the fixture is in its shuttled out position, it closes a limit switch LS7 which is located on the machine base and is illustrated only in Fig. 16. Also, the indexing gauge or checking fixture 501 is in its retracted position, so that the limit switch LS8 is not engaged by the actuator member cap screw 585 and is in its closed position, whereby relay CR6 is energized. After the ring gear has been clamped in place, the operator pushes the motor starting button, which starts the various hydraulic motors illustrated as well as the cycle starting button 621, which when closed causes relay CR1 to close and energize LS1, which shifts valve 627 so that the hydraulic liquid flowing from the fixture pump 623 through a resistance valve 625, and the four-way valve 627 will flow into the piston and cylinder units 159 to cause the slides 163 to be retracted or moved back to their reset positions. When the slides return to their retracted position, limit switches LS2 and LS3 are tripped, which energizes relay CR2, which in turn energizes solenoid S2, which causes a flow of liquid through four-way valve 631 to the clamping piston and cylinder units 149 so as to retract the clamping members 143 or move the same out of engagement with the fixture rotor, and also causes a flow through resistance valve 633 to the indexing plunger piston and cylinder unit 219 to cause retraction of the plunger 229 from the tapered notch 61 in the fixture locking member 55. When the indexing plunger 229 is retracted limit switch LS5 is tripped, which energizes relay CR4, which in turn energizes solenoid S3, which causes the liquid to flow through four-way valve 627 to the indexing cylinders 159 so as to move the slides 163 inwardly and thereby index the ring gear and rotor. At the completion of their movement the slides 163 actuate limit switches LS1 and LS4, as previously described, which causes the energization of relay CR3, which in turn energizes solenoid S4, which shifts the four-way valve 631 to direct liquid to the indexing plunger cylinder 219, which causes the indexing plunger 229 to move inwardly into the tapered notch 61 in the locking member 55, which effects the final positioning of the ring gear for the broaching operation. After the plunger has been moved inwardly pressure builds up in conduit 634 and causes the liquid to flow through resistance valve 636 to the clamping cylinders 149, which causes the clamping members 143 to lock the ring gear in position on the rotor and eliminate the running clearance, as previously described. The inward movement of the indexing plunger 229 trips limit switch LS5 which energizes relay CR5 and illuminates light 635, which indicates to the operator that the indexing cycle has been completed. The operator then pulls a starting lever in the machine, which trips limit switch LS9, which in turn actuates solenoid S7 to move the fixture inwardly to position the fixture and ring gear in position for engagement by the broaches during the subsequent downward movement thereof. As soon as the table moves inwardly, suitable mechanism, not herein shown or described, is actuated to cause the broach to move downwardly to broach the teeth in the ring gear. The operating cycle of the broaching mechanism is controlled by suitable or conventional circuits such as the type illustrated in applicant's Patent No. 2,385,119, issued September 18, 1945, for Broaching Machines.

As soon as the broach completes its downward movement during which the teeth are broached in the ring gear, the fixture automatically is moved outwardly so that the broaches can return to their up position without contacting the ring gear, and when the table moves outwardly it trips limit switch LS7, while the machine circuit continues to put the broaches back in their starting position and automatically stops the broaching cycle. At the completion of this movement, the operator again pushes the fixture cycle starting button 621 and the fixture cycle, previously described, is repeated.

As was previously pointed out, the spacer or stop block 209 is actuated by the piston and cylinder unit 201, the actuation of which is controlled by the actuation of a limit switch LS6, supported on the base, by the fixture rotor cam 216. When cam 216 trips limit switch LS6, solenoid S5 is energized, which shifts four-way valve 637 and directs the flow of hydraulic liquid through conduit 639 to the cylinder 201, which moves the stop 209 into its inward position. When the cam moves out of engagement with limit switch LS6, after a portion of the indexing movement, as previously described, solenoid S5 is de-energized and solenoid S6 is energized, which reverses the four-way valve 637 and directs the flow of liquid through conduit 641 to the cylinder, which causes retraction or outward movement of the stop 209.

Upon completion of the broaching of the ring gear, the operator manually releases the ring gear clamping devices 87 and pulls lever 646, which actuates four-way valve 647, and directs a flow of liquid through conduit 649 to the ejector cylinders 135, which causes the ejector pins 127 to move upwardly and lift the ring gear away from the fixture rotor. The operator then returns lever 646 to its original position which shifts valve 647 and directs the flow of liquid through conduit 651 to the ejector cylinders 135, which retracts the ejector pins 127. After the ejector pins have returned to their fully retracted position, pressure builds up in conduit 651, tripping pressure switch PS1, which is an interlock on the cycle start button, so that if the ejector pins are not fully retracted the fixture cycle cannot thereafter be started. Prior to removing the ring gear from the fixture the pitch diameter thereof is checked by checking fixture 501. This is accomplished by the operator actuating a lever which causes the flow of liquid to the checking fixture piston and cylinder unit 571 and the outward movement of the checking fixture bar members so that a reading on dial indicator 609 can be taken. When the ring gear is being checked, or when the checking fixture is extended the limit switch LS8 has been opened by the cap screw abutment member 585 carried on the checking fixture, thereby preventing energization of relay CR6 and inadvertent starting of the fixture cycle. After the checking fixture has been retracted, limit switch LS8 is closed and the fixture cycle can be started as previously described. Thus the ring gear can be checked before it is removed from the fixture, and any errors or tolerances can be corrected immediately without the necessity of removing the ring gear for checking and remounting it in the fixture for reworking.

It will, of course, be appreciated that if desired the fixture electrical and hydraulic circuits could be tied in with the broaching machine hydraulic and electrical circuits to provide a fully automatic machine in which the broaching operation would take place automatically upon completion of the indexing and locking operations of the ring gear, and subsequently the further indexing operations would take place automatically upon the completion of each broaching stroke. However, for purposes of simplicity, such an arrangement has not been shown herein, but it is to be understood that such an arrangement is within the scope of this invention.

It will thus be seen that the device of this invention permits the rapid and efficient broaching of extremely large ring gears, in an improved manner not heretofore known.

What is claimed is:

1. In a broaching machine, a base, a vertical column extending upwardly from said base, means on said vertical column for supporting a broach for vertical reciprocation, a fixture encompassing said vertical column and supported on said base for horizontal movement relative to said vertical column, said fixture including a rotatable member disposed around said vertical column for supporting a ring-shaped work member in a generally horizontal position, in which said ring-shaped member surrounds said vertical column and is engageable by the broach on the vertical column when said fixture is moved to a predetermined position relative to said vertical column, means on said rotatable fixture member for releasably clamping the work member thereto, and means on said fixture and said base for rotatably indexing said rotatable fixture member to present different portions of the work member to the broach.

2. In a broaching machine, a base, a vertical column extending upwardly from said base, means on said vertical column for supporting a broach for reciprocation, a fixture on said base for supporting a work member in a position to be broached, said fixture including a base having an annular surface, a rotor rotatably supported on said fixture base and having a complemental annular surface adjacent to and engageable with said fixture base annular surface, means on said rotor for releasably connecting a work member thereto which surrounds said vertical column, a pair of clamping devices supported on said fixture base adjacent to and on opposite sides of said vertical column broach supporting means, each of said clamping devices including a clamping member engageable with said rotor to clamp the annular surface thereof into engagement with the fixture base annular surface to eliminate running clearance between said rotor and base, means for actuating said clamping members, whereby the portion of said rotor adjacent the broaches will be clamped tightly in a predetermined position during the broaching operation, and means for rotatably indexing said rotor relative to said fixture base to present different portions of the work member in position for broaching.

3. In a broaching machine, a base, a vertical column extending upwardly from said base, means on said vertical column for supporting a broach for reciprocation, a fixture on said base for supporting a work member in a position to be broached, said fixture including a base having an annular surface, a rotor rotatably supported on said fixture base and having a complemental annular surface adjacent to and engageable with said fixture base annular surface, means on said rotor for releasably connecting a work member thereto which surrounds said vertical column, a pair of clamping devices supported on said fixture base adjacent to and on opposite sides of said vertical column broach supporting means, each of said clamping devices including a clamping member engageable with said rotor to clamp the annular surface thereof into engagement with the fixture base annular surface to eliminate running clearance between said rotor and base, means for actuating said clamping members, whereby the portion of said rotor adjacent the broaches will be clamped tightly in a predetermined position during the broaching operation, means for rotatably indexing said rotor relative to said fixture base to present different portions of the work member in position for broaching, and means operatively interconnecting said clamping devices actuating means and said indexing means to automatically effect release of said clamping devices prior to actuation of said indexing means and actuation of said clamping devices after each indexing operation.

4. In a broaching machine, a base, a vertical column extending upwardly from said base, means on said vertical column for supporting a broach for vertical reciprocation, a fixture supported on said base for supporting a work member to be broached, said fixture encompassing said base and including a fixture base member, a rotor rotatably supported on said fixture base member, complemental annular surfaces on said fixture base member and said rotor for guiding the rotatable movement of said rotor relative to said base, clamping members supported on said fixture base and engageable with said rotor for maintaining said rotor annular surface in engagement with said fixture base annular surface, movable indexing members supported on said base for engaging said rotor and rotatably indexing the same, a locking member movable into engagement with said rotor to lock the same against rotative movement relative to said base after each indexing operation, means for actuating said indexing members, clamping members and locking member, and means interconnecting said actuating means so that said clamping members and locking member will automatically move into engagement with said rotor after said indexing members have been actuated and will automatically move away from said rotor prior to actuation of said indexing members.

References Cited in the file of this patent

UNITED STATES PATENTS

| Number | Name | Date |
| --- | --- | --- |
| 572,207 | Lindsay | Dec. 1, 1896 |
| 1,300,092 | Acton | Apr. 8, 1919 |
| 1,460,525 | Wickland | July 3, 1923 |
| 1,533,671 | Steele | Apr. 14, 1925 |
| 1,909,766 | Johnson | May 16, 1933 |
| 2,086,850 | Bullard | July 13, 1937 |
| 2,183,430 | Monroe | Dec. 12, 1939 |
| 2,271,583 | Dornhofer | Feb. 3, 1942 |
| 2,358,225 | Gotberg | Sept. 12, 1944 |
| 2,358,503 | Godfriaux | Sept. 19, 1944 |
| 2,371,053 | Lapointe | Mar. 6, 1945 |
| 2,511,418 | Schulte | June 13, 1950 |
| 2,522,712 | Gotberg | Sept. 19, 1950 |
| 2,623,295 | Orlandi | Dec. 30, 1952 |